United States Patent [19]
McCartney

[11] 3,936,145
[45] Feb. 3, 1976

[54] FIBER OPTIC ALIGNMENT SLEEVE

[75] Inventor: Ronald L. McCartney, Orange, Calif.

[73] Assignee: International Telephone and Telegraph Corporation, New York, N.Y.

[22] Filed: Nov. 7, 1974

[21] Appl. No.: 521,627

[52] U.S. Cl. ............................................. 350/96 C
[51] Int. Cl.² .......................................... G02B 5/14
[58] Field of Search ........... 350/96 C, 96 B, 96 WG; 250/227; 65/4

[56] References Cited
UNITED STATES PATENTS

| | | | |
|---|---|---|---|
| 3,790,791 | 2/1974 | Anderson | 350/96 C X |
| 3,846,010 | 11/1974 | Love et al. | 350/96 C X |
| 3,861,781 | 1/1975 | Hasegawa et al. | 350/96 C |

*Primary Examiner*—Davis L. Willis
*Attorney, Agent, or Firm*—T. L. Peterson

[57] ABSTRACT

A fiber optic connector for providing a removable light signal transfer connection between the ends of at least one pair of fiber optic cables. The fiber optic cable consists of a jacket and at least one, and usually a plurality of glass fiber conducting elements within said jacket. The fiber optic cable ends to be connected are each encased within an elongated hollow terminating pin. The optical fibers are constrained within the terminating pin into a compact shape having the cross-sectional outline of a hexagon or other polygon. The guide sleeve is provided which includes axial grooves which engage the corners of the polygon face at the terminal end of the terminating pin to effect twist mode or rotational alignment. The guide sleeve is of small cross-section in the vicinity of the point of abutment of the opposing fiber bundles but flares toward the insertion ends.

16 Claims, 5 Drawing Figures

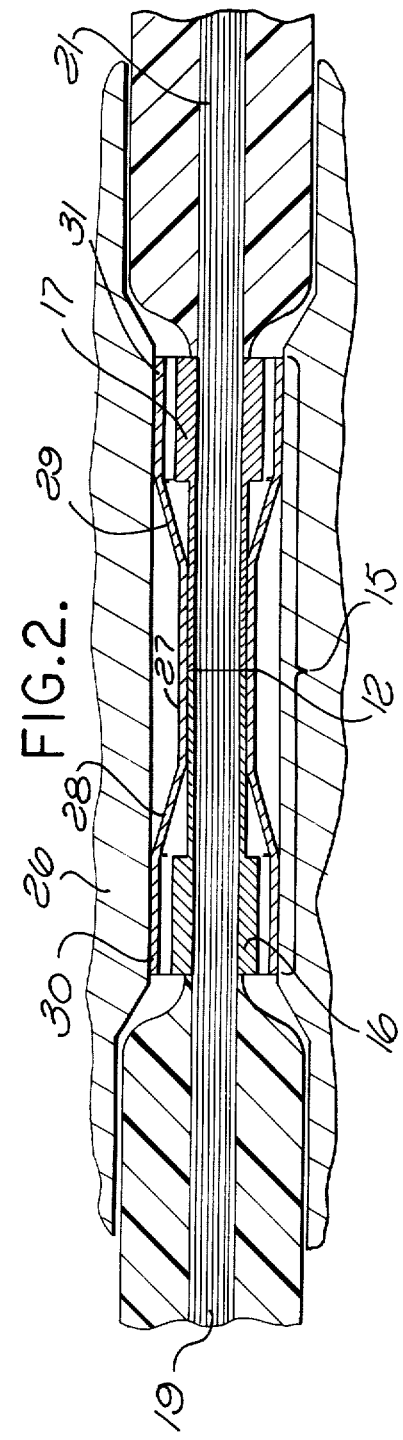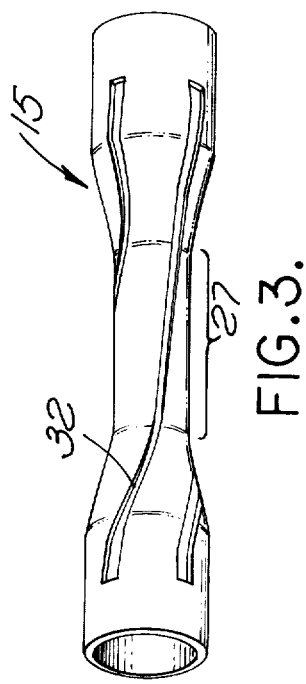

FIBER OPTIC ALIGNMENT SLEEVE

BACKGROUND OF THE INVENTION

1. Field of the Invention

The invention relates to connectors for use with fiber optic cables.

2. Description of the Prior Art

The employment of fiber optic cables or light guides, also sometimes referred to as optical communication fibers, for the transmission of information-bearing light signals, is now an established art. Much development work has been devoted to the provision of practical low-loss glass materials and production techniques for producing glass fiber cables with protective outer coatings or jackets. The jacket makes them resemble ordinary metallic-core electrical cable upon superficial external inspection. Obviously, if fiber optic cables are to be used in practical signal transmission and processing systems, practical connectors for the connection and disconnection of fiber optic cables must be provided.

Before the prior art in respect to connectors, per se, is discussed, some references will be given for the benefit of the skilled reader in understanding the state of fiber optic art in general.

An article entitled "Fiber Optics" by Narinder S. Kapany, published in the SCIENTIFIC AMERICAN, Vol. 203, Pages 72–81, dated Nov. 1960, provides a useful background in respect to some theoretical and practical aspects of fiber optic transmission.

Of considerable relevance to the problem of developing practical fiber optic connectors, is the question of transfer efficiency at the connector. Various factors, including separation at the point of abutment, and lateral separation or offset, are among the factors effecting the light transfer efficiency at a connector. In this connection, attention is directed to the Bell System Technical Journal, Vol. 50, No. 10, Dec. 1971, specifically to an article by D. L. Bisbee, entitled "Measurement of Loss Due To Offset, and End Separations of Optical Fibers". Another Bell System Technical Journal article of interest appeared in Vol. 52, No. 8, Oct. 1973 and was entitled "Effect of Misalignments on Coupling Efficiency on Single-Mode Optical Fiber Butt Joints" by J. S. Cook, W. L. Mammel and R. J. Grow.

The patent literature also contains much information relative to the state of this art. For example, U.S. Pat. No. 3,624,816 describes a "Flexible Fiber Optic Conduit". The device described therein uses a plurality of light conducting fibers in a flexible cable type arrangement.

Concerning the utility of fiber optic cables and therefore the utility of connectors for such cables, various systems are described in the patent literature which employ fiber optic cables. One example of such a utilization system is described in U.S. Pat. No. 3,809,908.

Yet another patent of interest is entitled "Glass Fiber Optical Devices," U.S. Pat. No. 3,589,793. That reference relates to the fiber optic bundles and the glass fibers themselves, as well as to a method of fabrication for the fiber optic elements themselves.

A selection of U.S. patents relating more particularly to optical cable connectors includes U.S. Pat. Nos. 3,790,791; 3,734,594; 3,637,284; 3,572,891; 3,806,225; 3,758,189 and 3,508,807 are representative of the connector prior art.

The termination pin surrounding the terminal end of a fiber bundle for insertion in a connector assembly may have any of a variety of cross-sectional shapes. Co-pending U.S. Pat. application Ser. No. 514,820, filed Oct. 15, 1974, entitled "Fiber Optic Connector and Assembly Method" describes a terminating pin arrangement of hexagonal cross-section, this being a particularly efficient shape for maximizing the ratio of glass fiber surface at the fiber bundle terminal end to the voids within the perimeter of the bundle.

The terminating pin illustrated in the aforementioned U.S. Pat. application Ser. No. 514,820, is a suitable terminating pin arrangement of hexagonal cross-section at its terminal end, for use in the combination of the present invention.

Due to tolerances in prior art arrangements, the fiber optic bundle abutment at the light signal transfer point may be slightly offset in a lateral (radial) or transverse dimension, i.e., within the plane of the said abutment. This may occur even though the axial abutment is efficiently held. Moreover, in the case of a polygon terminating pin arrangement, such as the hexagon shape contemplated in the aforementioned U.S. Pat. Application Ser. No. 514,820, there is also a rotational or twist mode alignment problem. Quite obviously, the most efficient light transmission at the abutment requires accurate lateral alignment and also requires that the termination pin cross-sectional shapes coincide, i.e., corner for corner, etc.

The manner in which the present invention deals with the aforementioned problems will be evident as this description proceeds.

SUMMARY OF THE INVENTION

The present invention may be said to have had the object of providing an alignment sleeve for use in fiber optic connectors which will simply, inexpensively and effectively provide lateral and rotational alignment of abutting fiber optic bundles in a light signal transmissive arrangement. The invention is substantially independent of whatever axial retention means are provided and also can be adapted to any particular cross-sectional fiber bundle shape at the abutting or interface point.

According to the invention, an axially grooved thin wall sleeve preferably of spring metal, is located so as to bridge over between and within the two socket portions of mating connector shells. The connector shells and sockets may be not unlike those well known in the electrical connector art, and may provide for the accommodation of only one fiber optic cable connecting pair or for a relatively large number of such connections accomplished in parallel within the same connector shell and socket arrangement.

The alignment sleeve, in accordance with the present invention, can accommodate fiber bundle terminal end configurations of circular cross-section, or of polygon cross-section. It is particularly adapted to the hexagonal configuration, this being a particularly efficient shape for achieving optimum packing of the individual fibers. That is, it is known that in the hexagonal terminal end configuration, the ratio of the terminal end area of the glass fibers to the ratio of the voids therebetween, is relatively high.

The axial sleeve, according to the invention, overlaps the said optical fiber interface or abutment point and extends for a distance in both directions therefrom. A certain amount of flaring to an increased diameter on either side of the said abutment point accommodates the insertion of the termination pins on the ends of the abutting fiber bundles, however, a relatively constant diameter section extending on either side of the said point of abutment is desirable. The axial grooves or slots through the thin wall of the sleeve perform two functions. First, they allow for a nominal interference fit between the sleeve inside diameter and the termination pins to be inserted therein, the fingers or wall sections between grooves being allowed to expand resiliently radially outward to maintain an inwardly directed spring force which acts to effect and hold transverse (lateral) alignment of the termination of the terminal ends, that is, of the fiber bundles aligned. Second, in the case of a polygon terminal end fiber bundle shape, the corners of the termination pin engage the said grooves and insure alignment in the rotational or twist mode. The grooves may be straight, i.e., parallel to the axis of the connector, or may be spiralled or "rifled" to provide a random "pick-up" of the termination pin corners during insertion. In that case, there is some automatic rotation of the termination pin to effect the said twist mode alignment as insertion is accomplished.

The manner in which the present invention accomplishes the desired results will be more fully understood from the description following.

BRIEF DESCRIPTION OF THE DRAWINGS

FIG. 2 is an axial cross-section showing the alignment sleeve in accordance with the present invention.

FIG. 3 is a pictorial view of the alignment sleeve in accordance with the present invention showing the axial slots in "rifled" or spiral form.

FIG. 4(a) shows the terminal end view of a hexagonal termination pin containing a fiber optic bundle and showing its engagement with the alignment sleeve slots.

FIG. 4(b) is essentially the same as FIG. 4(a) except that it depicts a termination pin and fiber optic bundle of square cross-section at the terminal end.

DESCRIPTION OF THE PREFERRED EMBODIMENT

Figure 1:
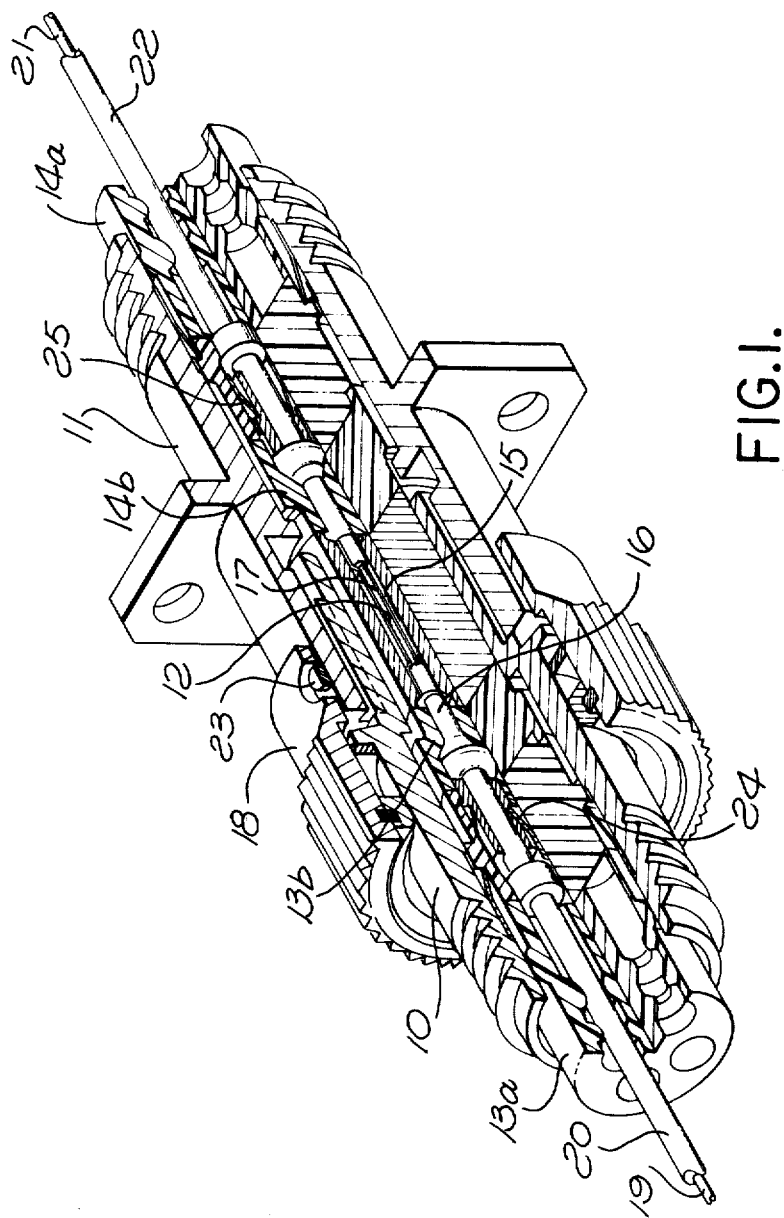
FIG. 1 is a partially cut-away pictorial of a mated connector assembly in accordance with the present invention.

Referring now to FIG. 1, the partially cut-away and sectioned pictorial view presented shows mated connector shells 10 and 11 having socket members comprising 13a and 13b within connector shell 10, and socket members 14a and 14b within connector shell 11. These connector shells and socket members generally consist of two or more members for assembly convenience, however, that fact is not of significance in respect to the present invention.

It will be seen, particularly from socket member 13a, that FIG. 1 shows a connector assembly adapted for connecting four pairs of fiber optic cables, although, for clarity, only one connecting pair of fiber optic cables (comprising the fiber optic bundle 19 with its jacket 20 and the fiber optic bundle 21 with its jacket 22) is actually shown in FIG. 1.

The mating of the connector shells 10 and 11 is effected in a straightforward way by the engagement of the ring 18 against the projection 23 on the body of the connector shell 11. Being cut away, as is the view of FIG. 1, the slot in 18 which actually engages 23 is not fully illustrated. Actually, the said slot would include a cam-like shape, so that the rotation of the ring 18 acts to draw the connector shell parts 10 and 11 together. Of course, a threaded engagement between the parts 18 and 11 could equally well be used insofar as the combination of the present invention is concerned.

The opposing termination pins 16 and 17 contain the fiber optic bundles 19 and 21, respectively, are held in axial abutment at their terminal ends at 12. Spring members 24 and 25 tend to retain these members in firm abutment at point 12, whether or not this abutment includes an index matching interface piece, or a coating of jell or other substance as sometimes used in connection with fiber bundle connections. Also, end grinding and polishing may be applied to the fiber bundle ends, however, this too is a manufacturing detail not forming a part of the present invention, per se.

The alignment sleeve, in accordance with the present invention, is illustrated generally at 15.

Referring now to FIG. 2, this alignment sleeve 15 may be described in more detail, so that its function in providing the rotational, or twist mode alignment, and the lateral (sometimes called transverse or radial) alignment, may be more fully understood. The socket body member shown generally at 26 may be a part of 13b or 14b, or may be an independent part related thereto. It is of significance only in respect to its presence as a retainer for the part 15.

It will be seen that the part 15 overlaps and extends in both directions from the point of abutment or interface 12. The axially extending portion of 15 at 27 has the smallest diameter and extends a sufficient distance on either side of 12 to provide a length of lateral surface contact against the termination pins 16 and 17 containing the respective fiber bundles 19 and 21. The extent of the overlap of this portion 27 over 12 is preferably on the order of at least one to two times the termination pin outside diameter on either side of 12. Actually, the length of the section 27 is not at all critical and it will be evident to those skilled in this art that considerable variation is possible so long as the part 15 firmly grips 16 and 17 in the vicinity of 12.

The part 15 is next flared at 28 and 29 over a relatively small axial distance to provide for easy guidance of the parts 16 and 17 as they are inserted during mating of the connector shell parts shown in FIG. 1. In connection with subsequent figures, the function of axial slots in the body of the alignment sleeve 15, will be explained.

Finally, at its extremities 30 and 31, the alignment sleeve 15 is preferably returned to an unflared cylindrical shape so that it may be readily inserted into and held within the socket member 26. Again, the axial length of the portions of 15 represented by 30 and 31 is subject to considerable design variation, once the functions of the three separately shaped sections of 15 are understood.

Referring now to FIG. 3, the part 15 is shown in pictorial form. The axially extending slots (of which 32 is typical) are shown with a certain amount of spiraling or "rifling". Although the invention can also be made to operate with straight slots, (i.e., slots which are parallel to the lengthwise axis of the part 15) this rifling (or spiraling) is particularly useful when the termination pins 16 and 17 are of hexagonal shape as illustrated in FIG. 4(a) or of square shape as indicated in FIG. 4 (b).

It is to be understood that FIGS. 4(a) and 4(b) illustrate two possible cross-sectional shapes for termination pins 16 and 17, however, in general, the invention is capable of accommodating any regular polygon shape, i.e., having N corners spaced 360°/N circumferentially, as viewed in FIG. 4(a) or FIG. 4(b). The particular polygon contemplated, determines the minimum number N of regularly spaced corresponding slots (typically 32) through the wall of 15. Thus, for FIG. 4(a), a minimum of six such slots as 32, corresponding to the six corners of the hexagon outline of 16 or 17 would be required. Of course, additional slots between these six main slots could be provided, however, as this description proceeds, it will be understood that such additional slots may introduce the possibility of a rotationally ambiguous abutment occurring at 12. Accordingly, it is preferred that the number of slots provided should be equal to N.

It will be understood that the body of the part 15 being made of a relatively thin-walled resilient material of relatively high tensil strength, such as a spring metal which can be intentionally fabricated to provide a nominally interference fit within the portion 27 with respect to the outside dimensions of 16 or 17. In that way, insertion of the termination pins 16 or 17 tends to spread the fingers represented by the strips of material between the slots in 15. Accordingly, along the axial extent of the portion 27 these fingers will exert a radially inward force tending to prevent lateral or transverse offset between the termination pin and fiber optic terminal ends at 12. In both FIGS. 4(a) and 4(b), it will be seen that a typical slot 32 engages a corner of the polygon outline of the termination pin 16 or 17. Moreover, if each of the slots 32 has a total circumferential twist as a function of axial length from 12, i.e., if the pitch of the rifling or spiraling is on the order of 360°/N it is assured that no matter what the rotational orientation of either the termination pin 16 or 17 is at the time of insertion into 15, the cross-sectional outlines of these termination pins at 12 will be congruent or coextensive at abutment, thereby matching each other in the rotational sense.

From the foregoing, it will now be clear how the alignment sleeve 15 provides for both lateral and rotational alignment which is obviously important for efficient light signal transfer at 12.

Of course, in the event that the termination pin 16 or 17 has a terminal end cross-sectional shape which is circular, there is no rotational alignment problem, as such. In that case, the alignment sleeve 15 can, nevertheless, provide the required transverse or lateral alignment of the optical fiber terminal ends at 12. It will also be evident that in that case the number of slots 32 about the circumference of 15 need not be governed by the 360°/N criterion which is important in connection with the polygon termination pin outline.

Various modifications and variations will suggest themselves to those skilled in this art. For example, the spiraling portion of the slots 32 can be confined to the outer extremities of the slots on either side of center, the slots being (in that case) parallel to the axis of the part 15 in the vicinity of the interface point 12. Also, the extent to which these slots extend through the flared portions 28 and 29 is subject to a certain amount of variation, and will depend upon the relationship between the interior cavity diameter at 30 and 31, and the size of the outline of the polygon termination pin 16 or 17. Other such variations and modifications can, of course, be made, once the principles of the present invention are understood. Accordingly, it is not intended that the scope of the invention be considered limited by the drawings or this description, these being typical and illustrative only.

What is claimed is:

1. In a fiber optic connector for providing a removable light signal connection between the terminal ends of at least one pair of fiber optic cables, said pair including first and second cables each having a plurality of optical fibers and each including a termination pin of predetermined cross-sectional ends thereof, said connector further including first and second mating connector members adapted to contain at least said pair of cables and corresponding termination pins, the combination comprising:

retaining means within said first and second connector members, respectively, for retaining said termination pins and therefore said terminal ends of said corresponding first and second fiber optic cables in substantial axial light-transferring abutment when said first and second connector members are mated; and means including an alignment sleeve of resilient material within said first and second connector members for effecting lateral alignment of said terminal ends of said termination pins and corresponding fiber optic cables, said sleeve including at least one axially extending slot through the wall of said sleeve over an axial dimension overlapping the point of said abutment, said sleeve being of an initial diameter over said axial dimension such that insertion of said termination pins produces resilient lateral expansion of said sleeve to produce inwardly directed radial forces tending to hold said terminal ends in lateral alignment.

2. Apparatus according to claim 1 in which the cross-sectional shape of said alignment sleeve is generally circular, said sleeve embodying a plurality of said slots, said slots being equally spaced about the circumference of said alignment sleeve.

3. Apparatus according to claim 2 in which said axial slots are spiralled.

4. Apparatus according to claim 2 in which said alignment sleeve is flared to a larger diameter at both ends beginning at points outward from said axial dimension.

5. Apparatus according to claim 1 in which said alignment sleeve is flared at both ends outward from said point of abutment.

6. Apparatus according to claim 1 in which said alignment sleeve is flared to a larger diameter at both ends beginning at points outward from said axial dimension.

7. Apparatus according to claim 1 in combination with a pair of said fiber optic cables, the termination pins of said cables extending into the opposite ends of said sleeve, the cross-sectional shape of the termination pin of each said cable being a polygon, one corner of each said polygon engaging said axial slot in said alignment sleeve thereby constraining said termination pins into rotational as well as lateral alignment.

8. Apparatus according to claim 7 in which the cross-sectional shape of said alignment sleeve is generally circular, and in which said sleeve embodies a plurality of said slots, the number of said axial slots in said alignment sleeve being equal to the number of corners of said polygon, said slots being equally spaced about the circumference of said alignment sleeve, the corners of said abutting terminaion pins engaging in said axial slots.

9. Apparatus according to claim 8 in which said axial slots are spiralled to provide for random engagement of a corner of said polygon during mating of said connector members.

10. Apparatus according to claim 8 in which said axial slots are spiralled by an amount not exceeding 360°/N measured about the circumference of said alignment sleeve, where N is the number of corners in said polygon, thereby to provide random engagement of said corners in said slots.

11. Apparatus according to claim 8 in which said cross-sectional shape of said termination pins is a hexagon and said axial slots are six in number.

12. Apparatus according to claim 10 in which said polygon is a hexagon and N=6.

13. A fiber optic cable coupling assembly comprising:
   an alignment sleeve of resilient spring material;
   a pair of fiber optic cables each having a fiber bundle terminated by a termination pin;
   at least one axially extending slot through the wall of an axial section of said sleeve, said axial section having a cross-section less than that of said pins; and
   said pins being mounted in the opposite ends of said sleeve and abutting each other in said axial section thereof thereby causing resilient lateral expansion of said sleeve to produce inwardly directed radial forces holding said pins in lateral alignment.

14. An assembly as set forth in claim 13 wherein:
   said sleeve embodies a plurality of said slots.

15. An assembly as set forth in claim 14 wherein:
   each said pin is a polygon;
   said slots are equal in number to the corners of said polygon; and
   said corners of said polygons engage said slots to effect rotational as well as lateral alignment of said pins.

16. An assembly as set forth in claim 15 wherein:
   said slots are spiralled.

* * * * *